(12) United States Patent
Yasugi et al.

(10) Patent No.: US 7,092,786 B2
(45) Date of Patent: Aug. 15, 2006

(54) TOOL DAMAGE/ABNORMALITY DETECTING DEVICE

(75) Inventors: Kuniharu Yasugi, Yamanashi (JP); Susumu Maekawa, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/208,855

(22) Filed: Aug. 23, 2005

(65) Prior Publication Data

US 2006/0142893 A1 Jun. 29, 2006

(30) Foreign Application Priority Data

Dec. 28, 2004 (JP) ............................ 2004/380437

(51) Int. Cl.
*G06F 19/00* (2006.01)
(52) U.S. Cl. ...................... 700/174; 702/182
(58) Field of Classification Search ........ 700/174–177, 700/179–180; 702/182–186
See application file for complete search history.

(56) References Cited

U.S. PATENT DOCUMENTS

| 4,456,960 A * | 6/1984 | Wakai .................. 700/175 |
| 2003/0163286 A1 * | 8/2003 | Yasugi .................. 702/185 |
| 2004/0068394 A1 * | 4/2004 | Maekawa et al. ........... 702/185 |

FOREIGN PATENT DOCUMENTS

| EP | 1 342 534 | 9/2003 |
| EP | 1 407 853 | 4/2004 |
| JP | 56-139855 | 10/1981 |
| JP | 3446518 | 7/2003 |
| JP | 2003-326438 | 11/2003 |
| JP | 2004-130407 | 4/2004 |

OTHER PUBLICATIONS

European Search Report dated Mar. 24, 2006; Application No. 05255012.6

* cited by examiner

*Primary Examiner*—Zoila Cabrera
(74) *Attorney, Agent, or Firm*—Staas & Halsey LLP

(57) ABSTRACT

A tool damage/abnormality detecting device capable of easily appropriately setting an allowable range for a value of comparison between a present value and a near past average for indexes indicative of loads on a tool. A machining cycle counter index i is adjusted to i=0, machining is performed as the loads are detected in a given period, and indexes H(i) (area S of load values, absolute value ($G^-$) of a maximum inclination between two points obtained during a decrease of loads, etc.) are acquired for n number of cycles. Thereafter, the indexes and values of comparison between the index value for a present cycle and the indexes for the n number of cycles are acquired. A first comparison value can be used for initial value setting for threshold values. If any of the comparison values is deviated from the allowable range, the threshold values are updated so that the allowable range extends, and an update history is saved. If damage/abnormality is observed visually or in any other manner, a threshold value update discontinue command is inputted, machining is stopped after completion of the cycle concerned, and update values for the latest threshold value are collected to be used as set threshold values.

18 Claims, 4 Drawing Sheets

TOOL DAMAGE/ABNORMALITY DETECTING DEVICE

BACKGROUND OF THE INVENTION

1. Field of the Invention

The present invention relates to a tool damage/abnormality detecting device for detecting damage/abnormality, such as breakage of a tool used in machining, in machining workpieces of the same material into one and the same shape or continuously machining a large number of workpieces, such as components of the same specifications, by using a machine tool, and more specifically, to a technique to enable the detecting device to appropriately easily set an allowable range for indexes used for tool damage/abnormality detection. Typical tools to be subjected to damage/abnormality detection include a drill of a machining center, a tapping tool for tapping work, etc.

2. Description of the Related Art

In general, a tool used in a machine tool has its edge worn so that its cutting resistance gradually increases with the passage of machining time. With the passage of additional time, moreover, breakage of the tool, as well as its abrasion, results in damage or other similar abnormality, so that necessary machining accuracy for workpieces cannot be maintained. In such a case, it is naturally inappropriate to continue the same machining, and the tool must be replaced with a new one. The aforesaid damage or other similar abnormality will hereinafter be referred to as damage/abnormality.

Already proposed on this background are techniques for automatically detecting a situation equivalent to tool damage/abnormality in the currently prevailing unattended machining or long-time automatic machining. Many of the conventionally proposed techniques are based on a system described in JP 3446518B and JP2003-326438A and JP2004-130407A. In this system, indexes indicative of loads that act on a tool for machining a workpiece (torque of a motor for driving the tool and thrust load applied to the tool) are detected in a plurality of machining cycles. For each machining cycle, the index for the present machining cycle and an average of the indexes for the machining cycles preceding the present machining cycle are compared. If the result of the comparison is deviated from an allowable range of preset indexes, it is concluded that the tool is subject to damage/abnormality.

In setting the allowable range for an index, threshold values (normally, upper and lower limit values) for the index are preset, so that it is important how to determine the preset threshold values. If the preset threshold values are inappropriate, detection of damage/abnormality may be delayed to cause machining failure (because the allowable range is upwardly or downwardly too wide). If the detection of damage/abnormality is premature (or if the allowable range is upwardly or downwardly too narrow), on the other hand, tools with sufficient life expectancy may be wasted.

Actually, so far, no satisfactory technology development has been made to provide a method for appropriately setting threshold values for indexes indicative of loads that act on tools.

There is a method, for example, in which threshold values for an index (load average) are determined by multiplying, for example, a load average obtained by a cutting test or a load average obtained immediately before machining by a given coefficient. However, there is no designation of a specific method for setting the given coefficient. According to JP 3446518B in which "abnormality detecting method for rotary tool and apparatus therefor" is described, by way of example, threshold values are set in accordance with the changing rate of a load value. By doing this, abnormality can be detected accurately and appropriately on a real-time basis. More specifically, the threshold values are set by multiplying a damage load level Lmax fixed according to the size of a drill or the like by a constant k within the range of 0 to 1 that is settled depending on a changing rate $\Delta Fn$ of the load value.

However, there is no definite indication of specific methods for determining the aforesaid values Lmax and k. In general, data on damage loads vary depending on the machine, tool, work material, machining conditions, etc., so that it is very desirable to collect the data on the site of work. In the case of a drill or tap, although its abnormality can be detected during a machining cycle, it can be dealt with only after the termination of the machining cycle. Thus, real-time detection is not essential.

SUMMARY OF THE INVENTION

The present invention provides a tool damage/abnormality detecting device in which an allowable range defined by set values of thresholds for a comparison value can be set easily and appropriately. The detecting device detects indexes indicative of loads exerted on a tool for machining a workpiece (e.g., torque of a motor for rotating a tool, thrust load applied to the tool, etc.) for a plurality of machining cycles, compares the index in a present machining cycle with an average of indexes in a plurality of machining cycles preceding the present machining cycle, thereby obtaining the comparison value (value representing a quantitative relation; typically, a ratio between the present index and the average), and determines that the tool is subject to damage/abnormality when the comparison value is deviated from the preset allowable range.

The tool damage/abnormality detecting device for detecting damage/abnormality of the tool comprises set threshold value determining means for determining the set values of the thresholds (hereinafter referred to also as set threshold values) that define the allowable range for the indexes (indicative of the loads exerted on the tool) used as criteria for actual detection of damage/abnormality.

According to the present invention, initial values of the thresholds for the indexes are set by the set threshold value determining means. The occurrence of tool damage/abnormality is monitored as machining is performed experimentally. The threshold values for the indexes are successively updated in the direction to extend the allowable range for the indexes by utilizing index data obtained in a plurality of machining cycles. When the updating is discontinued response to a command to discontinue the updating, the set threshold values are determined based on the latest updated threshold value or threshold value data (threshold value history data obtained by near past updating) corresponding to the latest value. By doing this, the allowable range is set (or the set threshold values are determined) so that it reflects an index value at the time of occurrence of tool damage/abnormality in the experimental machining.

Thus, the present invention is applied to a tool damage/abnormality detecting device in which indexes each indicative of a load exerted on a tool for machining a workpiece are acquired for a plurality of machining cycles, an index acquired in a present machining cycle is compared with an average of indexes acquired in machining cycles preceding the present machining cycle to acquire a comparison value indicative of a result of the comparison in each machining cycle, and damage/abnormality of the tool is determined when the comparison value is deviated from an allowable range defined by set values of thresholds.

The tool damage/abnormality detecting device comprises set threshold value determining means for determining the set values of the thresholds, which includes: detecting means for detecting the indexes for a plurality of machining cycles; comparing means for comparing an index in a machining cycle with an average of indexes for a plurality of machining cycles preceding the machining cycle to acquire the comparison value indicative of a result of the comparison; first storage means for storing values of the thresholds; writing means for writing initial values of the thresholds in the first storage means to be stored therein; updating means for updating the values of the thresholds stored in the first storage means to values according to a comparison value that deviates from the allowable range defined by the values of the thresholds stored in the first storage means when the comparison value acquired in the machining cycle is deviated from the allowable range; second storage means for storing a threshold history containing at least some of the values of the thresholds stored in the first storage means prior to the latest updating; means for discontinuing the updating of the values of the thresholds in response to a command to discontinue the updating of the thresholds; and determining means for determining the set values of the thresholds based on the threshold history stored in the second storage means and the values of the thresholds stored in the first storage means when the update of the values of the thresholds is discontinued.

The set threshold value determining means may further comprises second storage means for storing a threshold history containing at least some of the values of the thresholds stored in the first storage means prior to the latest updating. In this case, the set values of the thresholds may be determined based on the threshold history stored in the second storage means when the update of the values of thresholds is discontinued in place of the values of the thresholds stored in the first storage means. Alternatively, the set values of the thresholds may be determined based on both the values of the thresholds are stored in the first storage means and the threshold history stored in the second storage means when the update of the thresholds is discontinued.

The indexes may include a difference (M) between maximum and minimum load values for a certain machining cycle, an area (S) of load values for the certain machining cycle, an average (L) of absolute values of loads for the certain machining cycle, a difference (Ldiff) between the average L of the absolute values of the loads for the certain machining cycle and an average L' of absolute values of loads for a directly preceding machining cycle, a value (M/L) obtained by dividing the difference M between the maximum and minimum load values for the certain machining cycle by the average L of the absolute values of the loads for the same machining cycle, an absolute value ($G^+$) a maximum inclination between two points obtained during an increase of loads in the certain machining cycle, and/or an absolute value ($G^-$) of a maximum inclination between two points obtained during a decrease of the loads in the certain machining cycle. The set valued of the thresholds may be determined for the indexes of various types so that the damage/abnormality of the tool is detected based on at least one of the determined set values of the thresholds.

The load exerted on the tool may be detected as a torque of a motor for rotating the tool or a thrust load exerted on the tool.

The writing means may write the initial values of the thresholds based on a first comparison value acquired by the comparing means into the first storage means. The tool may comprises a drill or a tap.

With the tool damage/abnormality detecting device according to the present invention, the allowable range for the indexes can be set easily and appropriately. According to the invention, moreover, the allowable range for the indexes can be easily set on a site of machining operation.

DETAILED DESCRIPTION

Figure 1:
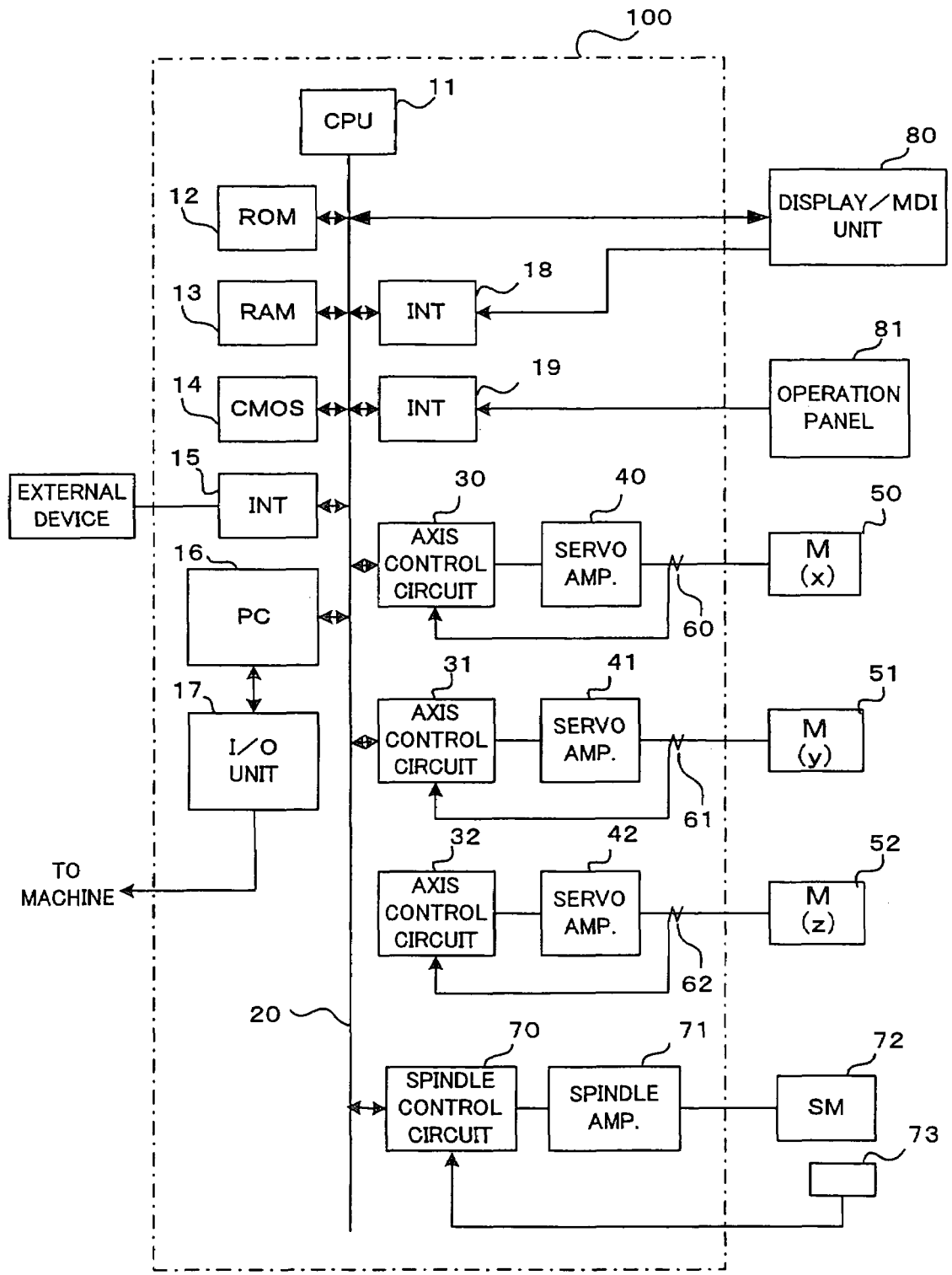
FIG. 1 is a schematic block diagram of a control device according to an embodiment of the present invention for controlling a machine tool.

FIG. 1 is a block diagram of a control device (numerical control device) 100 for machine tool control, which doubles as a tool damage/abnormality detecting device according to the present invention. In FIG. 1, a CPU 11 is a processor for generally controlling the control device 100. The CPU 11 reads a system program from a ROM 12 through a bus 20 and controls the entire control device 100 in accordance with the system program. A RAM 13 is stored with temporary calculation data, display data, and various data that are inputted by an operator through a display/MDI unit 80. A CMOS memory 14 is formed as a nonvolatile memory that is backed up by a battery (not shown) so that it can maintain a storage state even after the control device 100 is switched off.

The CMOS memory 14 is stored with a machining program read through an interface 15, a machining program inputted through the display/MDI unit 80, etc.

Further, the ROM 12 is preloaded with various system programs for processing edit modes that are required to make and edit the machining programs and executing processing for automatic operation. According to the present embodiment, furthermore, the ROM 12 is loaded with a processing program (a) for tool damage/abnormality detection and a processing program (b) for determining set threshold values.

The program (a) is a well-known processing program for detecting tool damage/abnormality by the aforesaid tool damage/abnormality detecting system. According to this system, indexes indicative of loads that act on a tool for machining a workpiece are detected for a plurality of machining cycles. For each machining cycle, an index for the present machining cycle and an average of indexes for a plurality of preceding machining cycles are compared. If the result of the comparison is deviated from an allowable range of preset indexes, it is concluded that the tool is subject to damage/abnormality.

On the other hand, the program (b) is a processing program that is proper to the present invention and serves to determine the set threshold values that define the allowable range of preset indexes in the process of (a). The contents of processing of these programs, especially processing of the program (b), will be described later in detail.

Returning to FIG. 1, the interface 15 enables connection between the control device 100 and an external device 82, such as an adapter. A machining program and the like are read from the side of the external device 82. Further, a machining program edited in the control device 100 can be stored into external storage means through the external device 82. A PC (programmable controller) 16 outputs a control signal to an auxiliary device (e.g., actuator such as a robot hand for tool change) for a machine tool through an I/O unit 17 in accordance with a sequence program contained in the control device 100.

The display/MDI unit 80 is a manual data input device that is provided with a display, keyboard, etc. An interface 18 receives command data from the keyboard and delivers it the CPU 11. An interface 19 is connected with an operation panel 81 that is located on the body of the machine tool. The operation panel 81 is provided with a warning lamp and various switches for inputting various commands to the machine tool.

Axis control circuits 30 to 32 for individual axes receive move commands for the axes from the CPU 11 and deliver them to servo amplifiers 40 to 42. On receiving these commands, the servo amplifiers 40 to 42 drive servomotors 50 to 52 for X-, Y- and Z-axes. The servomotors 50 to 52 individually contain position/speed sensors. Position/speed feedback signals from the position/speed sensors are fed back to the axis control circuits 30 to 32 and used for position/speed feedback control.

Further, driving currents that are delivered individually from the servo amplifiers 40 to 42 to the servomotors 50 to 52 are detected by current sensors 60 to 62 in the same manner as in the conventional case. They are fed back individually to the axis control circuits 30 to 32 and used for current (torque) control. The individual motors have substantially equal driving currents that flow through them, load torques, and thrust loads on feed axes driven by them. In this embodiment, therefore, the current sensor 62 for detecting the driving current that flows through the Z-axis drive servomotor 52 for tool feed is used to form means for detecting the thrust load on the tool. Position/speed feedback is not illustrated.

Then, a spindle control circuit 70 receives a spindle rotation command and performs speed control in accordance with a command speed and a feedback signal from a position coder 73 that generates feedback pulses in synchronism with the rotation of a spindle motor 72. On receiving a current feedback signal from a current sensor 74 for detecting a driving current that flows through the spindle motor 72, moreover, the spindle control circuit 70 performs current loop control and controls the rotational speed of the spindle motor 72. Since a load (torque) that acts on the spindle motor and the driving current are substantial proportional to each other, the current sensor 74 constitutes means for detecting the load on the spindle motor in this embodiment.

A drill or a tapping tool is supposed to be the tool to be attached to the spindle in the present invention. A large number of workpieces, such as components that have the same specifications, are successively bored or tapped, and set threshold values for the detection of damage/abnormality of the drill or tapping tool based on the aforesaid system are determined. The tool (drill or tapping tool) is mounted on the spindle, and each workpiece on a table that is driven by the servomotors 50 and 51 for the X- and Y-axes (feed axes). The tool is moved relatively to the workpiece by the servomotor 52 for the Z-axis, that is, a feed axis for moving the spindle in the Z-axis direction that is perpendicular to the X- and Y-axes.

Figure 2:
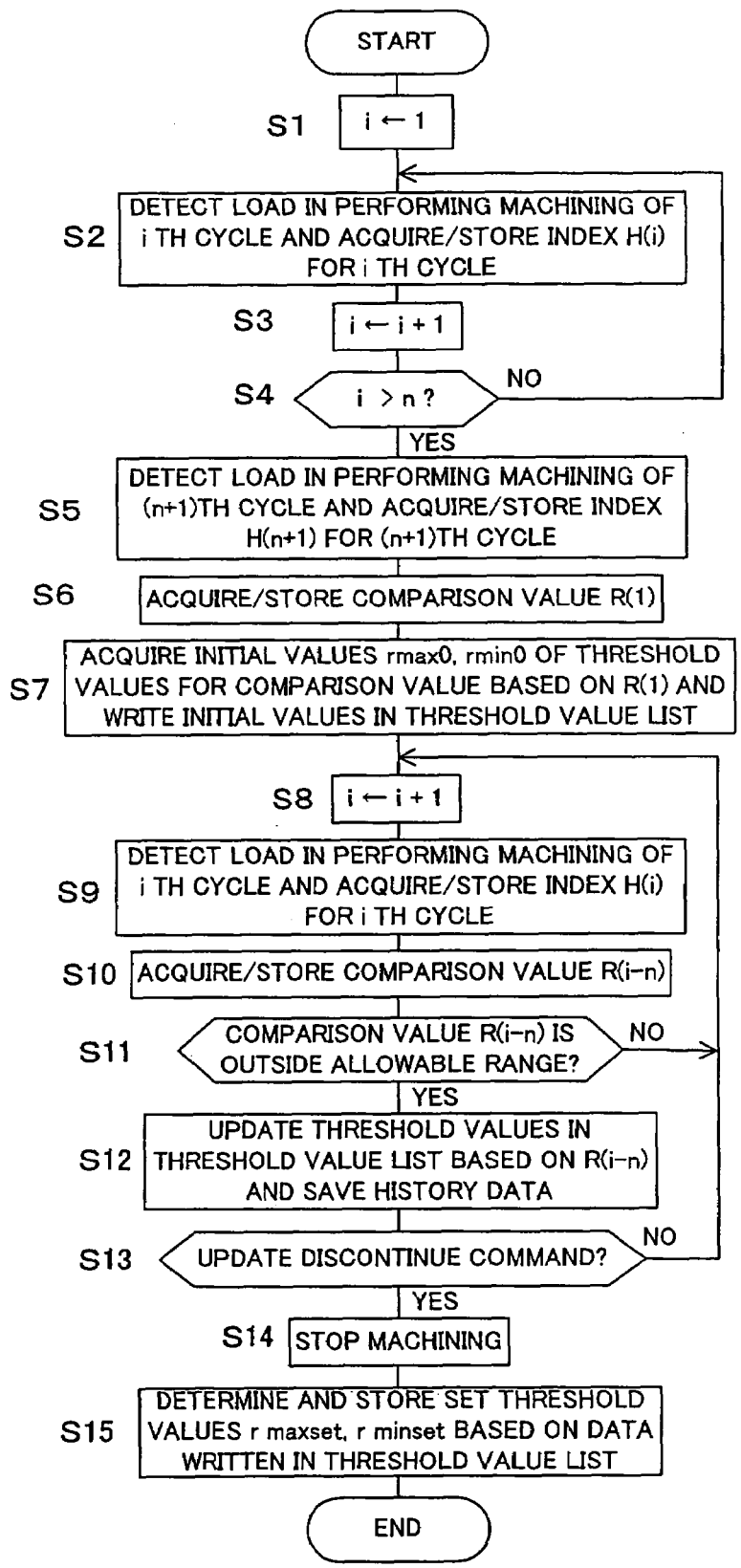
FIG. 2 is a flowchart illustrating an outline of steps of a processing program for determining threshold values to be executed according to the present embodiment.
Figure 3:
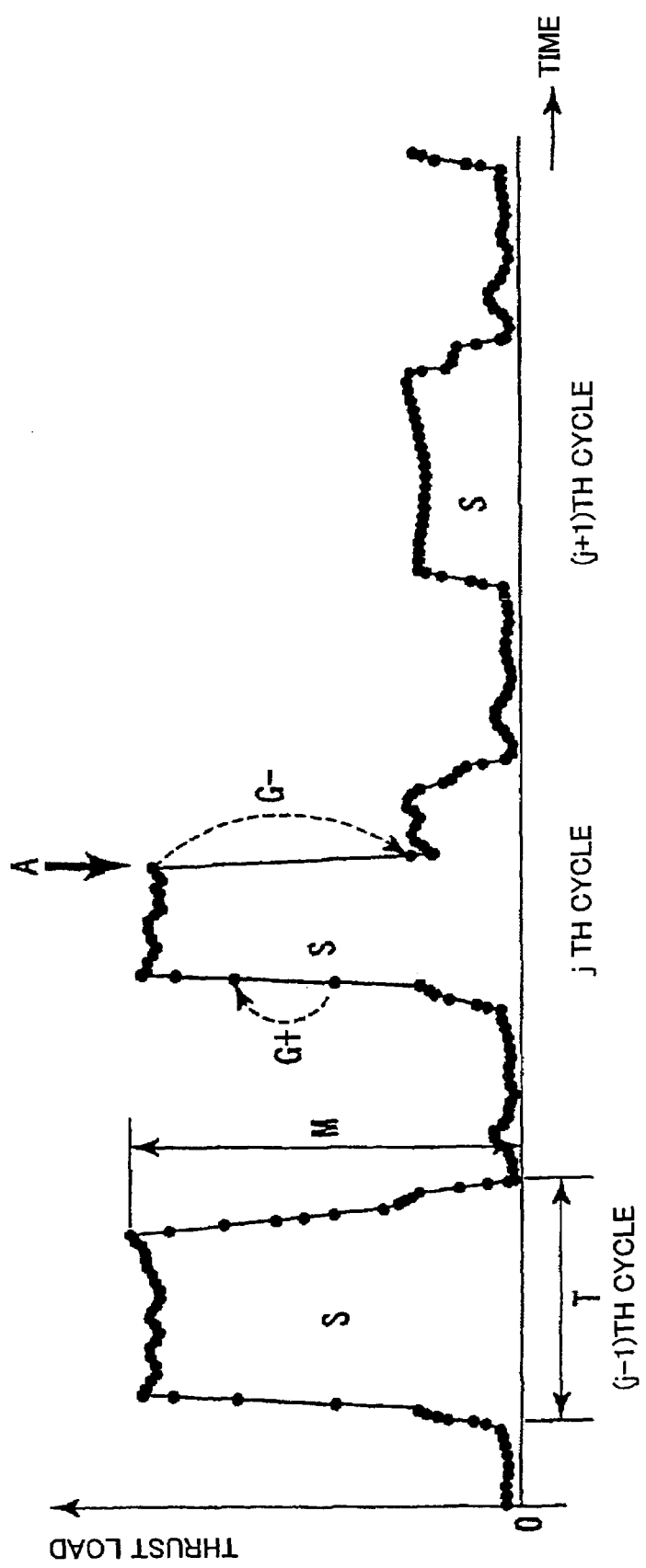
FIG. 3 is a graph showing an example of transition of a load (detected value) on a carbide drill as a tool in a machining cycle subject to damage/abnormality and machining cycles immediately before and after the occurrence of the damage/abnormality.
Figure 4:
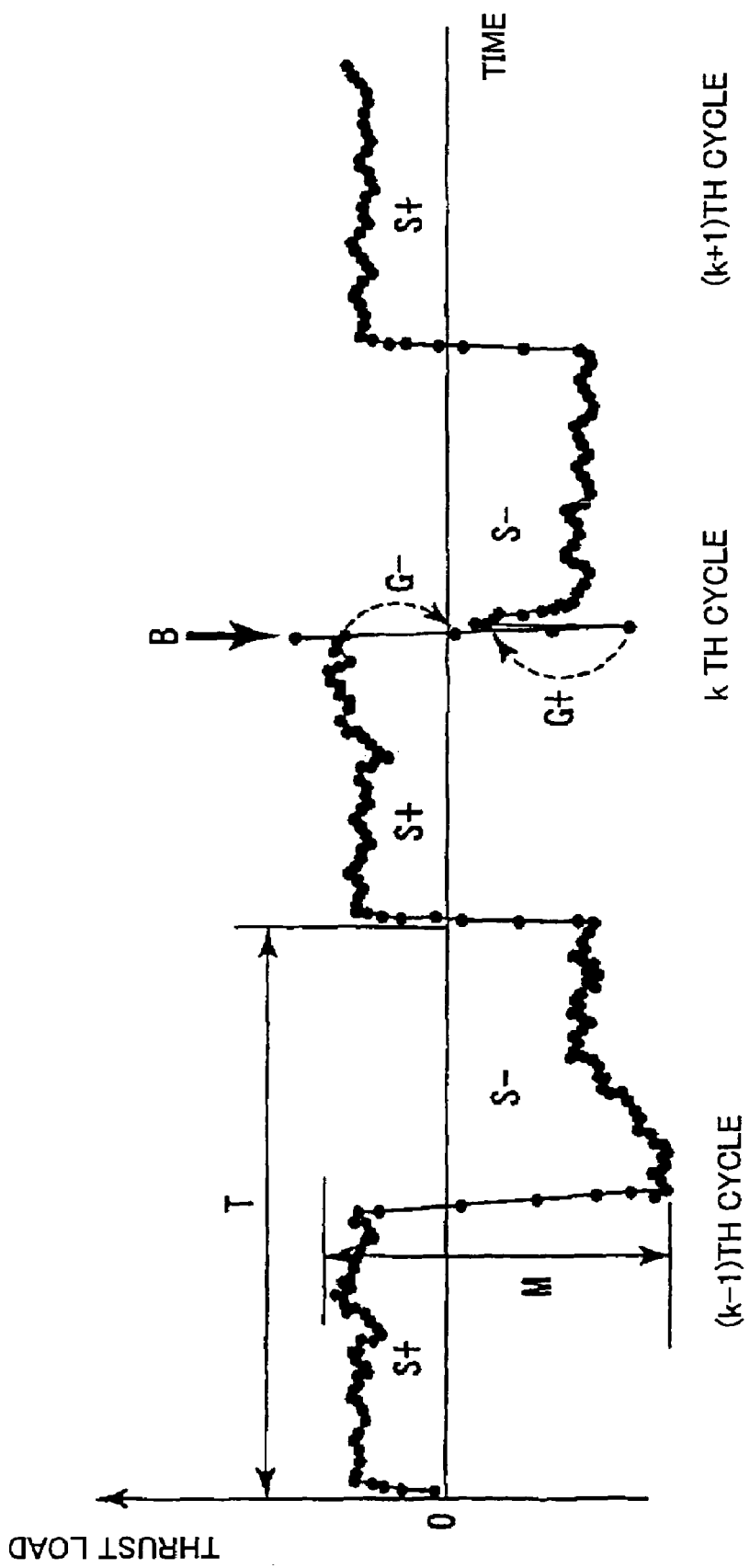
FIG. 4 is a graph showing an example of transition of a load (detected value) on a tapping tool (high-speed steel tap) as a tool in a machining cycle subject to damage/abnormality and machining cycles immediately before and after the occurrence of the damage/abnormality.

Referring also to FIGS. 2 to 4, there will be described the contents of the program (b) (processing program for determining set threshold values) for determining the set threshold values and items (comparison values, indexes, etc.) that are associated with the determined set threshold values. The program (a) (processing program for tool damage/abnormality detection) covers these contents.

FIG. 2 is a flowchart illustrating an outline of steps of the processing program (b) for determining the threshold values. FIGS. 3 and 4 are graphs showing examples of transition of loads (detected values) on two types of tools (boring drill in FIG. 3 and tapping tool in FIG. 4) in machining cycles subject to damage/abnormality and machining cycles immediately before and after the occurrence of the damage/abnormality.

In the processing of the program (b), conditions that are equivalent to conditions (workpiece type, machining type, model of tool used, etc.) for actual machining (machining cycles repeated many times before the detection of tool damage/abnormality) to which the program (a) are acquired, and experimental machining is carried out. The following is a description of essentials of the individual steps. The indexes, comparison values, etc. that are associated with the set threshold values will be described with reference to FIGS. 3 and 4.

Step S1: A counter index i for machining cycle counting is cleared to set an initial value (i=0).

Step S2: Machining of an i th cycle is performed as a load on the tool (hereinafter referred to also simply as load) is detected in a given period (e.g., 8 msec) is detected, whereupon an index H(i) indicative of a load on the tool is acquired. Indexes that are calculated in the present embodiment are suitably represented by symbol H. Further, a suffix (i) is attached to indexes H that are obtained in i th cycles, whereby indexes H(i) are obtained. The torque of the motor that rotates the tool and the thrust load of the Z-axis feed of the tool are typical loads to be detected. As mentioned before, the motor torque can be detected by the current sensor 74 for detecting the driving current that flows through the spindle motor 72 for driving the spindle. The thrust load can be detected by the current sensor 62 for detecting the driving current that flows through the Z-axis drive servomotor 52.

As is generally known, the loads that act on the tool have a similar load transition pattern for each machining cycle. If a tool undergoes damage/abnormality, in general, the load transition pattern starts drastically to change immediately after the occurrence of the damage/abnormality. FIGS. 3 and 4 show examples of the change.

FIG. 3 is a graph made by plotting measured values of thrust loads of the feed axis (Z-axis) for a machining cycle (j th cycle; j=2456, for example) subject to damage/abnormality (see arrow A) and machining cycles immediately before and after the occurrence of the damage/abnormality. The measured values are based on repeated boring work on a steel-S50C workpiece of 27.2-mm thickness at a spindle speed S of 7490 $\min^{-1}$ and feed speed F of 3,758 mm/min using a carbide drill of 6.8-mm diameter as the tool. If the torque (driving current) of the spindle motor for driving the tool (carbide drill) is detected, a similar transition pattern (not shown) can be obtained.

On the other hand, FIG. 4 is a graph made by plotting measured values of thrust loads of the feed axis (Z-axis) for a machining cycle (k th cycle; k=1826, for example) subject to damage/abnormality (see arrow B), a machining cycle immediately before the occurrence of the damage/abnormality, and a part of a machining cycle immediately after the occurrence. The measured values are based on repeated tapping work on a workpiece of the same kind at a spindle speed S of 717 min$^{-1}$ and feed speed F of 501.9 mm/min using a high-speed steel tap (tapping tool) of 4-mm diameter as the tool. If the torque (driving current) of the spindle motor for driving the tool (high-speed steel tap) is detected, a similar transition pattern (not shown) can be obtained.

Various indexes are successively calculated in accordance with the load data detected in this manner.

Various indexes H may be proposed to be acquired, and one of them is calculated. In this case, an index M, S, L, Ldiff, M/L, G$^+$ or G$^-$ is supposed to be calculated. In FIGS. 3 and 4, symbol T represents machining time (not including time for the removal of the drill in boring work).

M: A difference between maximum and minimum load values for a certain machining cycle. Normally, it takes a positive value. In some cases, the maximum and minimum load values may be reversed in polarity. In the latter half of the cycle, as shown in FIG. 4 (tapping), for example, the tool rotates reversely and the thrust load also acts reversely, so that the minimum load value is negative.

S: An area of load values for the certain machining cycle. If the loads for the former and latter halves of the cycle are opposite in polarity, an area S$^+$ of a portion with each load>0 and an area S$^-$ of a portion with each load<0 are added to calculate S=S$^+$+S$^-$.

L: An average S/T of absolute values of loads for the certain machining cycle.

Ldiff: A difference (absolute value) between the average L of the absolute values of the loads for the certain machining cycle and an average L' of absolute values of loads for a directly preceding machining cycle.

M/L: A value obtained by dividing the difference M for the certain machining cycle by the average L for the same machining cycle.

G$^-$: An absolute value of a maximum inclination between two points obtained during a decrease of the loads in the certain machining cycle (see FIGS. 3 and 4).

G$^+$: An absolute value of a maximum inclination between two points obtained during an increase of loads in the certain machining cycle (see FIGS. 3 and 4).

The finally determined values of these indexes are determined after the termination of the machining cycle concerned. However, calculation is started during machining work for those indexes which can be calculated by a method such that transient values, such as integrated values, are updated with every given period. For example, the index S can be obtained during steps of procedure in which the detected values (absolute values) of loads are integrated with every detection period (S=final integrated value×detection period).

Step S3: The value of the counter index i is incremented by 1.

Step S4: The value of the counter index i is checked. If it exceeds a predetermined value n, the procedure advances to Step S5. If the value n is not exceeded, the procedure returns to Step S2. Here n is a positive integer not smaller than 2, which is a predetermined number corresponding to the number of preceding machining cycles having an average that is compared with the index for the present machining cycle in the aforementioned detection system. Normally, an appropriate value of n ranges from about 3 to 10. If n=5 is given, for example, a decision output YES is obtained for the first time at the sixth Step S4 from the beginning of processing. As this is done, five indexes H(1), H(2), H(3), H(4) and H(5) are accumulated.

Step S5: Machining of the i th cycle is performed as loads that act on the tool are detected in a given period, and indexes H(i) indicative of the loads on the tool are acquired. The types of the acquired indexes H(i) have previously been described in connection with Step S2.

Step S6: A comparison value R(1) is acquired and stored for each type of the acquired indexes H(i). If n=5 is given, R(1) is $$R(1)=5\times H(6)/(H(1)+H(2)+H(3)+H(4)+H(5)).$$

For the index L, for example, R(1)L is $$R(1)L=5\times L(6)/(L(1)+L(2)+L(3)+L(4)+L(5)).$$

Although the "ratio" is used for the comparison value in this case, it is only a typical example. It may possibly be replaced with any other similar quantities (values quantitatively representing the preference in size). Further, the number "n" of preceding cycles that is used in calculating the comparison value need not necessarily be equal to the number "n real" of preceding cycles for the calculation of the comparison value that is used in actual tool damage/abnormality detection. In general, the relation may be n real≦n, it is desirable, however, that n real=n.

Step S7: Set threshold values rmax0 and rmin0 are written as initial set threshold values in a threshold value list using the comparison value R(1) acquired from the index H(6). The initial setting is performed in various methods, e.g., as follows:

$$r\text{max}0=(1+\alpha)R(1),$$

$$r\text{min}0=(1-\alpha)R(1).$$

Here rmax0 represents an initial set value for an upper limit threshold value rmax of a comparison value R, while rmin0 represents an initial set value for a lower limit threshold value rmin of the comparison value R. Further, α is a parameter for adjusting an allowable range to be initially set for the comparison value of each index, and ranges from 0 to about 0.1. If α=0 is given, rmax0=rmin0=R(1) is obtained, implying that the width of the allowable range for the comparison value for initial setting is zero. This arouses no problem, however, since a is supposed to be updated afterward. On the contrary, it is to be noted that a should not be set too large.

For the threshold values for the comparison value R calculated from detected values in the present cycle and n machining cycles prior to the present machining cycle of the indexes G$^+$ and G$^-$, among M, S, L, Ldiff, M/L, G$^+$ and G$^-$, only rmax0 is initially set in the aforesaid manner, and rmin0 is initially set so that rmin0=0. Since it is senseless to manage the lower limit of the absolute value of the inclination, the lower limit value may be merely nominal.

Thus, in the case of the present embodiment, the following fourteen threshold values are initially set:

Upper limit of comparison value for M,
Lower limit of comparison value for M,
Upper limit of comparison value for S,
Lower limit of comparison value for S,
Upper limit of comparison value for L,
Lower limit of comparison value for L,
Upper limit of comparison value for Ldiff,
Lower limit of comparison value for Ldiff, Upper limit of comparison value for M/L,
Lower limit of comparison value for M/L,
Upper limit of comparison value for $G^-$,
Lower limit of comparison value for $G^-$,
Upper limit of comparison value for $G^+$,
Lower limit of comparison value for $G^+$.

Further, rmax0 and rmin0 may be separately initially set for comparison values calculated from the individual indexes. Examples of set values for this case are given as follows:

(1) rmax0=1 and rmin0=0 are set for each comparison value for the indexes $G^+$ and $G^-$, (2) rmax0=1.05 and rmin0=0.95 are set for each comparison value for the indexes M, S, L, Ldiff and M/L.

Step S8: The value of the counter index i is incremented by 1.

Step S9: Machining of the i th cycle is performed as loads that act on the tool are detected in a given period, and indexes H(i) indicative of the loads on the tool are acquired. The types of the acquired indexes H(i) have previously been described in connection with Step S2.

Step S10: Comparison values value R(i-n) are acquired and stored for each type of the acquired indexes H(i). If n=5 is given, R(i-5) is $$R(i-5)=5\times H(i)/(H(i-1)+H(i-2)+H(i-3)+H(i-4)+H(i-5)).$$

For the index S, for example, R(1-5)S is $$R(i-5)S=5\times S(i)/(S(i-1)+S(i-2)+S(i-3)+S(i-4)+S(i-5)).$$

Step S11: The comparison values R(i-n) are checked for each index type to see if they are deviated from the then allowable range (between the lower and upper limit threshold values). If they are all within the allowable range, the procedure returns to Step S8. If not, the procedure advances to Step S12.

Step S12: The latest threshold values in the threshold value list are updated in accordance with the comparison value that is deviated from the allowable range. Data having so far been obtained are saved as history data (updating of threshold values and postscript of history data). The history data contain the comparison values, a cycle number concerned, and a discrimination code indicative of the upper or lower limit from which the values are deviated.

Step S13: It is checked whether or not a command to discontinue the threshold value updating is inputted. If the command is not inputted, the procedure returns to Step S8. If the command is inputted, the procedure advances to Step S14. For example, the operator monitors the threshold value update discontinue command by visually recognizing the occurrence of damage/abnormality of the tool or through the output of a separately provided failure sensor. When he/she recognizes the occurrence of damage/abnormality, the operator makes input by manual operation. Alternatively, the operator may be expected quickly to check conditions (e.g., shape and size of holes, etc.) after machining so that he/she can make manual input when lowering of accuracy is concluded to have started. Alternatively, moreover, the output of the failure sensor or the like may be used to input a command for automatically discontinuing renewal of threshold values.

Step S14: The machining is stopped after the presently started machining cycle is completed.

Step S15: Based on data written in the threshold value list, set threshold values rmaxset and rminset for the comparison values are determined for each index type. A final decision can be automatically made according to given rules, for example. A typical rule is a method in which update values for the latest threshold value are collected for each comparison value of each index type and used directly as set threshold values. According to another rule, update values for the latest threshold value are collected and subjected to fine adjustment, such as multiplication by a safety factor each.

The above is a description of the outline of the processing program for determining the threshold values. In the present embodiment, the threshold values (fourteen in total) are determined for settling the allowable range that are defined by the upper and lower limit values for comparison values for the indexes M, S, L, Ldiff, M/L, $G^+$ and $G^-$. However, these values are given as examples only, and only some of them may possibly be determined. Further, any other indexes than those examples may be used as indexes that represent loads on the tool.

All or some of the set threshold values determined in this manner are used for tool damage/abnormality detection based on the aforementioned system. Since this detection system is generally known, it will be typically described only in brief First, set threshold values (e.g., the aforesaid fourteen values) that are actually used for tool damage/abnormality detection are set and a new tool is mounted in place. After these prearrangements, indexes for n number of cycles are acquired in the same processing as Steps S1 to S5. In an (n+1)th cycle and its subsequent cycles, a comparison value is acquired for each index type. The comparison values are acquired in the same manner as in the foregoing processing. In particular, the number of machining cycles preceding the present machining cycle is supposed to be the same as the number (e.g., 5) used in Step S6 and the like.

Every time one comparison value is acquired, it is checked whether or not it is deviated from the allowable range that is defined by the set threshold values. If any one of the comparison values is deviated from the allowable range, it is concluded that the tool is subject to damage/abnormality. Thereupon, an alarm is outputted and the machining is stopped. As is evident from the foregoing description of the processes of determining the set threshold values, the set threshold values used in this case are not settled by the operator's intuition and skill, but automatically reflect actual test results. Thus, the set threshold values can be set without dispersion that may be attributable to differences in experience, and the reliability of the tool damage/abnormality detection is improved.

What is claimed is:

1. A detecting device for determining tool defect in which indexes, each index indicative of a load exerted on a tool for machining a workpiece, are acquired for a plurality of machining cycles, an index acquired in a present machining cycle is compared with an average of indexes acquired in machining cycles preceding the present machining cycle to acquire a comparison value indicative of a result of the comparison in each machining cycle, and determining damage and/or abnormality of the tool when the comparison value deviates from an allowable range defined by set values of thresholds, said detecting device comprising means for determining the set values of the thresholds, including:
   detecting means for detecting the indexes for a plurality of machining cycles;
   comparing means for comparing an index in a selected machining cycle with an average of indexes for a plurality of machining cycles preceding the selected machining cycle to acquire a comparison value indicative of a result of the comparison;

first storage means for storing values of the thresholds;

writing means for writing initial values of the thresholds in said first storage means;

updating means for updating the stored values of the thresholds to revised values according to a comparison value that deviates from an allowable range defined by the stored values of the thresholds when the comparison value acquired in the selected machining cycle deviates from the allowable range;

means for discontinuing the updating of the stored values of the thresholds in response to a command to discontinue the updating of the thresholds; and determining means for determining the set values of the thresholds based on the stored values of the thresholds when the update of the values of the thresholds is discontinued.

2. The detecting device according to claim 1, wherein said indexes include a difference between maximum and minimum load values for a certain machining cycle, an area of load values for the certain machining cycle, and an average of absolute values of loads for the certain machining cycle, a difference between the average of the absolute values of the loads for a directly preceding machining cycle, a value obtained by dividing the difference between the maximum and minimum load values for the certain machining cycle by the average of the absolute values of the loads for the same machining cycle, an absolute value of a maximum inclination between two points obtained during an increase of loads in the certain machining cycle, and/or an absolute value of a maximum inclination between two points obtained during a decrease of the loads in the certain machining cycle, and the set values of the thresholds are determined for the indexes of various types so that the damage/abnormality of the tool is detected based on at least one of the determined set values of the thresholds.

3. The detecting device according to claim 1, wherein the load exerted on the tool is detected as a torque of a motor for rotating the tool.

4. The detecting device according to claim 1, wherein the load exerted on the tool is detected as a thrust load exerted on the tool.

5. The detecting device according to claim 1, wherein said writing means writes the initial values of the thresholds based on a first comparison value acquired by said comparing means into said first storage means.

6. The detecting device according to claim 1, wherein the tool comprises a drill or tap.

7. A detecting device for determining tool defect in which indexes, each index indicative of a load exerted on a tool for machining a workpiece, are acquired for a plurality of machining cycles, an index acquired in a present machining cycle is compared with an average of indexes acquired in machining cycles preceding the present machining cycle to acquire a comparison value indicative of a result of the comparison in each machining cycle, and determining damage and/or abnormality of the tool when the comparison value deviates from an allowable range defined by set values of thresholds, said detecting device comprising means for determining the set values of the thresholds, including:

detecting means for detecting the indexes for a plurality of machining cycles;

comparing means for comparing an index in a selected machining cycle with an average of indexes for a plurality of machining cycles preceding the selected machining cycle to acquire a comparison value indicative of a result of the comparison;

first storage means for storing values of the thresholds;

writing means for writing initial values of the thresholds in said first storage means;

updating means for updating the stored values of the thresholds to revised values according to a comparison value that deviates from an allowable range defined by the stored values of the thresholds when the comparison value acquired in the selected machining cycle deviates from the allowable range;

second storage means for storing a threshold history containing at least some of the values of the thresholds stored in said first storage means prior to the latest updating;

means for discontinuing the updating of the values of the thresholds in response to a command to discontinue the updating of the thresholds; and determining means for determining the set values of the thresholds based on the values of the thresholds stored in said second storage means when the update of the values of the thresholds is discontinued.

8. The detecting device according to claim 7, wherein said indexes include a difference between maximum and minimum load values for a certain machining cycle, an area of load values for the certain machining cycle, and an average of absolute values of loads for the certain machining cycle, a difference between the average of the absolute values of the loads for a directly preceding machining cycle, a value obtained by dividing the difference between the maximum and minimum load values for the certain machining cycle by the average of the absolute values of the loads for the same machining cycle, an absolute value of a maximum inclination between two points obtained during an increase of loads in the certain machining cycle, and/or an absolute value of a maximum inclination between two points obtained during a decrease of the loads in the certain machining cycle, and the set values of the thresholds are determined for the indexes of various types so that the damage and/or abnormality of the tool is detected based on at least one of the determined set values of the thresholds.

9. The detecting device according to claim 7, wherein the load exerted on the tool is detected as a torque of a motor for rotating the tool.

10. The detecting device according to claim 7, wherein the load exerted on the tool is detected as a thrust load exerted on the tool.

11. The detecting device according to claim 7, wherein said writing means writes the initial values of the thresholds based on a first comparison value acquired by said comparing means into said first storage means.

12. The detecting device according to claim 7, wherein the tool comprises a drill or tap.

13. A detecting device for determining tool defect in which indexes, each index indicative of a load exerted on a tool for machining a workpiece, are acquired for a plurality of machining cycles, an index acquired in a present machining cycle is compared with an average of indexes acquired in machining cycles preceding the present machining cycle to acquire a comparison value indicative of a result of the comparison in each machining cycle, and determining damage and/or abnormality of the tool is when the comparison value deviates from an allowable range defined by set values of thresholds, said detecting device comprising means for determining the set values of the thresholds, including:

detecting means for detecting the indexes for a plurality of machining cycles;

comparing means for comparing an index in a selected machining cycle with an average of indexes for a plurality of machining cycles preceding the selected machining cycle to acquire a comparison value indicative of a result of the comparison;

first storage means for storing values of the thresholds;

writing means for writing initial values of the thresholds in said first storage means;

updating means for updating the stored values of the thresholds to values according to a comparison value that deviates from an allowable range defined by the stored values of the thresholds when the comparison value acquired in the selected machining cycle deviates from the allowable range;

second storage means for storing a threshold history containing at least some of the values of the thresholds stored in said first storage means prior to the latest updating;

means for discontinuing the updating of the stored values of the thresholds in response to a command to discontinue the updating of the thresholds; and determining means for determining the set values of the thresholds based on the threshold history stored in said second storage means and the values of the thresholds stored in said first storage means when the update of the values of the thresholds is discontinued.

14. The detecting device according to claim 13, wherein said indexes include a difference between maximum and minimum load values for a certain machining cycle, an area of load values for the certain machining cycle, and an average of absolute values of loads for the certain machining cycle, a difference between the average of the absolute values of the loads for a directly preceding machining cycle, a value obtained by dividing the difference between the maximum and minimum load values for the certain machining cycle by the average of the absolute values of the loads for the same machining cycle, an absolute value of a maximum inclination between two points obtained during an increase of loads in the certain machining cycle, and/or an absolute value of a maximum inclination between two points obtained during a decrease of the loads in the certain machining cycle, and the set values of the thresholds are determined for the indexes of various types so that the damage and/or abnormality of the tool is detected based on at least one of the determined set values of the thresholds.

15. The detecting device according to claim 13, wherein the load exerted on the tool is detected as a torque of a motor for rotating the tool.

16. The detecting device according to claim 13, wherein the load exerted on the tool is detected as a thrust load exerted on the tool.

17. The detecting device according to claim 13, wherein said writing means writes the initial values of the thresholds based on a first comparison value acquired by said comparing means into said first storage means.

18. The detecting device according to claim 13, wherein the tool comprises a drill or tap.

* * * * *

UNITED STATES PATENT AND TRADEMARK OFFICE
CERTIFICATE OF CORRECTION

| | | |
|---|---|---|
| PATENT NO. | : 7,092,786 B2 | Page 1 of 1 |
| APPLICATION NO. | : 11/208855 | |
| DATED | : August 15, 2006 | |
| INVENTOR(S) | : Kuniharu Yasugi et al. | |

It is certified that error appears in the above-identified patent and that said Letters Patent is hereby corrected as shown below:

Column 8, Line 47, After "since" change "a" to --*a* --.

Column 8, Line 48, After "that" change "a" to --*a* --.

Column 10, Line 23, After "brief" insert --.--.

Column 12, Line 62, After "tool" delete "is".

Signed and Sealed this

Ninth Day of January, 2007

JON W. DUDAS
*Director of the United States Patent and Trademark Office*